(12) United States Patent
Exner

(10) Patent No.: US 8,517,842 B2
(45) Date of Patent: Aug. 27, 2013

(54) ELASTIC SHAFT COUPLING WITH ADAPTIVE CHARACTERISTICS

(75) Inventor: Jochen Exner, Hennef (DE)

(73) Assignee: Centa-Antriebe Kirschey GmbH, Haan (DE)

(*) Notice: Subject to any disclaimer, the term of this patent is extended or adjusted under 35 U.S.C. 154(b) by 4 days.

(21) Appl. No.: 12/922,209

(22) PCT Filed: Jun. 13, 2008

(86) PCT No.: PCT/DE2008/000963
§ 371 (c)(1),
(2), (4) Date: Feb. 6, 2011

(87) PCT Pub. No.: WO2009/149676
PCT Pub. Date: Dec. 17, 2009

(65) Prior Publication Data
US 2011/0159968 A1    Jun. 30, 2011

(51) Int. Cl.
F16D 27/00    (2006.01)
H02N 2/00    (2006.01)

(52) U.S. Cl.
USPC .............................. 464/29; 464/85

(58) Field of Classification Search
USPC .......... 464/29, 68.91, 68.9, 81, 85; 74/572.2, 74/573.12, 574.1, 574.4; 310/26
See application file for complete search history.

(56) References Cited

U.S. PATENT DOCUMENTS

| 2,417,850 | A |  | 3/1947 | Winslowa |
| 2,661,825 | A |  | 12/1953 | Winslow |
| 3,354,670 | A | * | 11/1967 | Fawick |
| 5,315,203 | A |  | 5/1994 | Bicos |
| 5,545,089 | A |  | 8/1996 | Kirschey |
| 6,069,433 | A |  | 5/2000 | Lazarus et al. |
| 6,464,587 | B2 |  | 10/2002 | Kirschey |
| 6,520,678 | B2 |  | 2/2003 | Aiken et al. |
| 6,773,352 | B2 | * | 8/2004 | Hartel et al. .................... 464/29 |
| 6,889,803 | B2 | * | 5/2005 | Schankin et al. |
| 7,497,782 | B2 |  | 3/2009 | Kirschey |
| 2003/0089193 | A1 | * | 5/2003 | Altieri et al. |
| 2006/0081086 | A1 | * | 4/2006 | Crist ........................... 74/574.1 |
| 2007/0117638 | A1 | * | 5/2007 | Kirschey |

FOREIGN PATENT DOCUMENTS

| DE | 102006053282 | * | 5/2008 |
| DE | 102006053282 | A | 5/2008 |
| EP | 0784163 | A | 7/1997 |

OTHER PUBLICATIONS

"A Hooke's Law Spring." 4Physics. May 11, 2006, [online], [retrieved on Feb. 26, 2013] Retrieved from the Internet <URL: http://web.archive.org/web/20061105142802/http://www.4physics.com/phy_demo/HookesLaw/HookesLawLab.html>.*

* cited by examiner

Primary Examiner — Gregory Binda
Assistant Examiner — Josh Skroupa
(74) Attorney, Agent, or Firm — Andrew Wilford

(57) ABSTRACT

An elastic shaft coupling has a resilient coupling body, a drive-side connector and an output-side connector connected to opposite sides of the coupling body, and an actively controllable damping mass. A connecting element connects the damping mass to the coupling body. Adjusting elements acting on the connecting element can influence how the shaft coupling compensates for torsional vibrations.

11 Claims, 3 Drawing Sheets

ELASTIC SHAFT COUPLING WITH ADAPTIVE CHARACTERISTICS

CROSS REFERENCE TO RELATED APPLICATIONS

This application is the US-national stage of PCT application PCT/DE2008/000963, filed 13 Jun. 2008, published 17 Dec. 2009 as WO2009/149676, and claiming the priority of PCT patent application PCT/DE2008/000963 itself filed 13 Jun. 2008.

FIELD OF THE INVENTION

The invention relates to an elastic shaft coupling with a resilient coupling body and a drive-side connector such as a mounting flange for securing the coupling to an engine flywheel and an output-side connector such as a mounting flange for securing the coupling to a shaft hub.

BACKGROUND OF THE INVENTION

Elastic shaft couplings of this type are known in numerous different embodiments with axial force flow or radial force flow, with one or more resilient coupling bodies that are connected in series or in parallel. Examples are the shaft couplings of DE 100 13 412 [U.S. Pat. No. 6,464,587] or DE 10 2005 055 605 [U.S. Pat. No. 7,497,782] that are published.

Besides the compensation of radial and/or axial offset of drive aggregate and/or output aggregate, these elastic shaft couplings serve in particular for absorbing torsional vibrations and torque peaks between input and output assemblies as generated, for example, by an irregularly running diesel engine.

Each coupling is designed for a predetermined operating range in which it can reduce the rotational vibrations of the complete system in a particularly good manner. In certain applications, a plurality of couplings of the above-described type is connected together, for example, to achieve an optimal damping over a wide speed range of the drive. Here, a first coupling absorbs the rotational vibrations at low speeds and a second coupling absorbs the rotational vibrations at high speeds. As an example for such a coupling arrangement, EP 0 626 523 [U.S. Pat. No. 5,545,089] is to be mentioned in which a coupling stage with a linear characteristic and a coupling stage with a progressive characteristic are interconnected to form a two-stage coupling arrangement. In this manner, a coupling can be provided that is able to compensate for rotational vibrations over a wide operating range of the drive.

Two-stage couplings that take advantage of the effect of different characteristics of the coupling bodies for compensation of rotational vibrations perform their task substantially in a very reliable manner; however, they have the problem that here, on the one hand, the operating range of the complete system is still limited by the sum of operating ranges of the respective coupling bodies and, on the other hand, the compensation of torsional vibrations in the transition range from one to the other coupling stage is still in need of improvement.

OBJECT OF THE INVENTION

It is therefore the object of the invention to provide a coupling that can effectively reduce torsional vibrations in a wide frequency range.

SUMMARY OF THE INVENTION

This object is attained by an elastic shaft coupling in which adjusting elements act directly or via a connecting element on the resilient coupling body and can influence how the shaft coupling compensates for torsional vibrations, it being in particular provided that the adjusting elements are embedded in the coupling body, preferably if the inherent elasticity of the resilient body can be influenced by the adjusting elements in a continuously variable manner within a range.

The adjusting elements according to the invention allow for actively influencing or changing the coupling body's resilient material's inherent capability to compensate for torsional vibrations. This has the essential advantage that a single coupling body or a single coupling element consisting of a plurality of individual bodies is sufficient to compensate for torsional vibrations of a very wide frequency range. This way it is possible in the future to simplify in particular two- or multi-stage coupling arrangements known from the prior art with respect to their structure by using only the coupling body according to the invention instead of a plurality of couplings stages.

It is an essential advantage here if the adjusting elements are embedded directly in the coupling body to keep the structure of the coupling body simple.

In fact, the adjusting elements act on the resilient body's inherent elasticity and change it. For this, the inherent elasticity of the resilient body can be reduced by the adjusting elements. This allows one to cover with only one coupling body such ranges of use in which torsionally very soft, thus highly elastic coupling elements were used combined with stiff to very stiff coupling elements to form multi-stage coupling arrangements. Depending on the current operating state of the coupling, the elasticity of the coupling body is increased for compensating for torsional vibrations or, if necessary, decreased again.

For this, an actuator is provided that influences the adjusting elements such that, due to the rotational movement of the coupling body, it is an essential advantage if the actuator influences the adjusting element in a contactless manner.

For actively controlling the elastic shaft coupling, a sensor element is provided that detects the operating state of the coupling, in particular the torsional vibration, and in a particularly preferred embodiment of the invention the adjusting elements, the actuator, and the sensor are part of a control circuit that influences the elasticity of the resilient body by comparing a set point and an actual value of the torsional vibration of the shaft coupling.

In a concrete embodiment the resilient coupling body is a magneto-rheological elastomer in which adjusting elements in the form of magnetic particles are embedded.

In a magneto-rheological elastomer, magnetic particles are directly embedded in the elastomer that has significant advantages with respect to the manufacturing of the coupling body. To produce such an elastomer it is only necessary to mix the magnetic particles into the vulcanization material without the need to provide a specific design of the coupling body. Furthermore, magneto-rheological elastomers are suitable for transmitting high torques, for example in the area of ship propulsion.

These are also the essential advantages over couplings from the heterogeneous prior art. Couplings described in U.S. Pat. No. 2,417,850 and U.S. Pat. No. 2,661,825 use electro-rheological fluids. Here, the coupling element is structured in any case in a complex manner because there have to be fluid chambers.

From the heterogeneous prior art, in particular the dissertation of Dr. Dietrich Lampe, Technische Universität Dresden, the use of magneto-rheological fluids in couplings is known. As is the case when using electro-rheological fluids, here too, the structure of the coupling body is much more complex due to the provision of fluid chambers. In addition, there is a risk of segregation of the magneto-rheological fluids. Ultimately, couplings that use electro-rheological or magneto-rheological fluids are not powerful enough for large-scale technical use.

If the resilient coupling body is a magneto-rheological elastomer, it is necessary that the actuator be a device for generating a magnetic field, the actuator being an electromagnet, in particular if the field strength of the electromagnet is controllable.

Alternatively, the actuator can be a permanent magnet.

In an alternative embodiment of the invention the adjusting elements are piezo elements, in particular piezo elements being embedded as adjusting elements in the resilient coupling body.

Besides magnetic particles in the elastomer, the use of piezo elements too has the essential advantage that they can be embedded directly into the resilient body, in particular into an elastomer. Here, the effect is utilized that, during deformation, certain crystals, quartzes or industrially produced sinter ceramics generate an electric field between two poles or, during the inverse piezo effect, deform due to an applied voltage. Consequently, by applying a voltage, a deformation of the piezo elements within the resilient coupling body can be achieved, which deformation acts in the opposite direction of a torsional vibration pulse and, in the optimal case, damps same entirely.

To increase the adjustment stroke and the adjustment force it is provided that the piezo elements are put together to form stacks.

In a particularly preferred embodiment a portion of the piezo elements that are strung together in a stack serve as a sensor and detect the actual value of the torsional vibration and the other piezo elements serve as actuator for damping the torsional vibration. Here, the invention utilizes the piezo effect as well as the inverse piezo effect.

The essential advantage of this embodiment is that the adjusting element combines sensor and actuator in itself. An external sensor that detects the actual state of the torsional vibration of the coupling is thus superfluous.

This coupling design utilizes further the fact that there is a time delay between the occurrence of first torsional vibration pulses and their mechanical effect. Within the time delay, the actual value can be detected and compared with the set point, and the counter pulse necessary for vibration damping can be triggered.

In a third embodiment it is conceivable that the resilient coupling body is connected via a connecting element to a mass damping the torsional vibration.

Here, it is in particular provided that the connecting element is a second resilient coupling body that can be influenced with respect to its stiffness by adjusting elements, in particular if the adjusting elements are piezo elements. The use of a magneto-rheological elastomer is also conceivable.

It is possible here to abandon the embedding of adjusting elements in the resilient coupling body and instead to control the stiffness and thus the effect of the damping mass by suitably influencing the connecting element. The compensation of the torsional vibration is carried out here solely by the damping mass. Of course, the connecting element, which is also designated as the second resilient coupling body, can be configured as a magneto-rheological elastomer or can comprise embedded piezo elements.

In general, an embodiment is preferred in which the coupling body is configured as elastomer.

BRIEF DESCRIPTION OF THE DRAWING

Further advantages of the invention are seen in the following description of different embodiments. Therein.

DETAILED DESCRIPTION OF THE INVENTION

In the figures, a coupling body of an elastic shaft coupling is indicated at 10. It is connected between a drive-side connector 30 (see FIGS. 5 and 6) and an output-side connector indicated schematically at 31.

Figure 1:
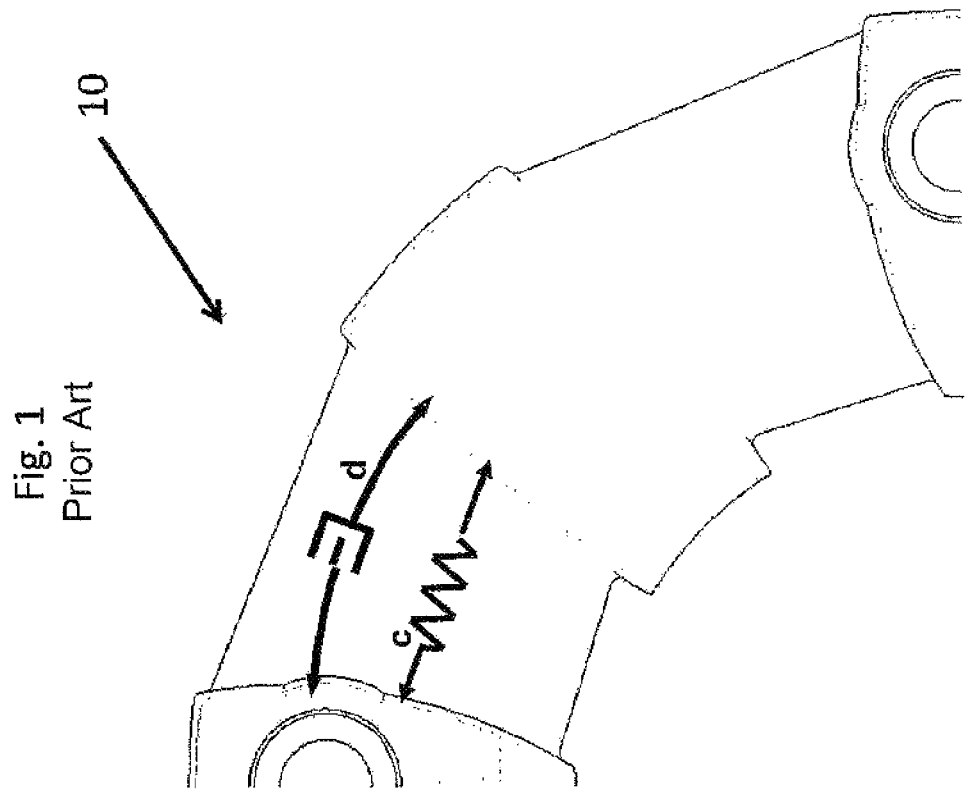
FIG. 1 is a partial schematic view of a known coupling element.
Figure 6:
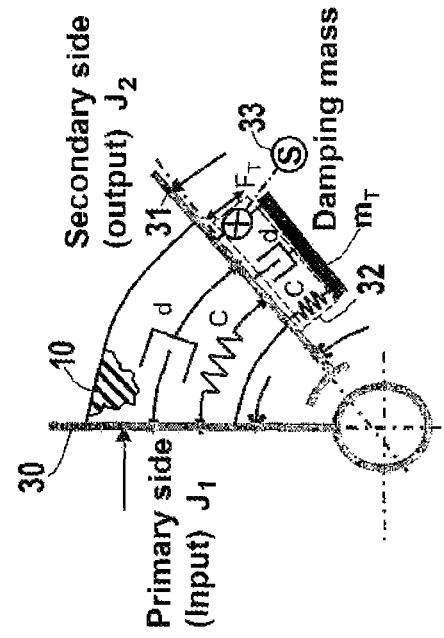
FIG. 6 is a schematic view showing how a damping mass controllable with respect to its effect influences torsional vibration.

The coupling body 10 of the prior art shown in FIG. 1 consists of resilient material, preferably an elastomer (see FIG. 6). Depending on its composition, the elastomer has a constant elasticity c and a constant damping d.

Figure 2:
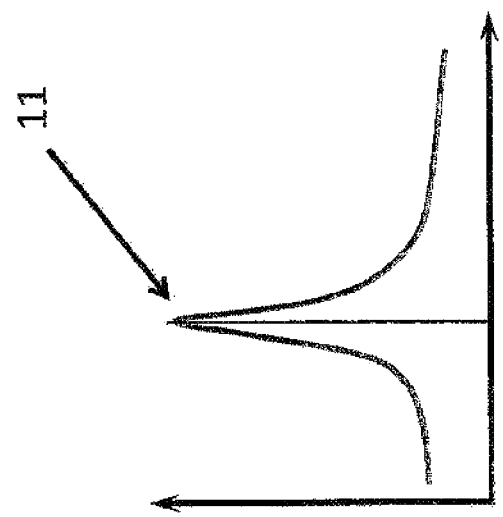
FIG. 2 is a graph showing the resonance position of the coupling element in FIG. 1 plotted against frequency.

The frequency diagram of FIG. 2 shows a possible torsional vibration curve of the coupling body in FIG. 1 plotted against frequency. The X-axis shows the frequency or speed and the Y-axis shows the amplification function, that is, in general, torque, force or distance. Peak vibration, which is to be avoided in a real system, is indicated at 11. Usually, a supercritical or subcritical position of the operating ranges is selected for this resonance peak. The frequency position for a coupling according to FIG. 1 is constant.

Figure 3:
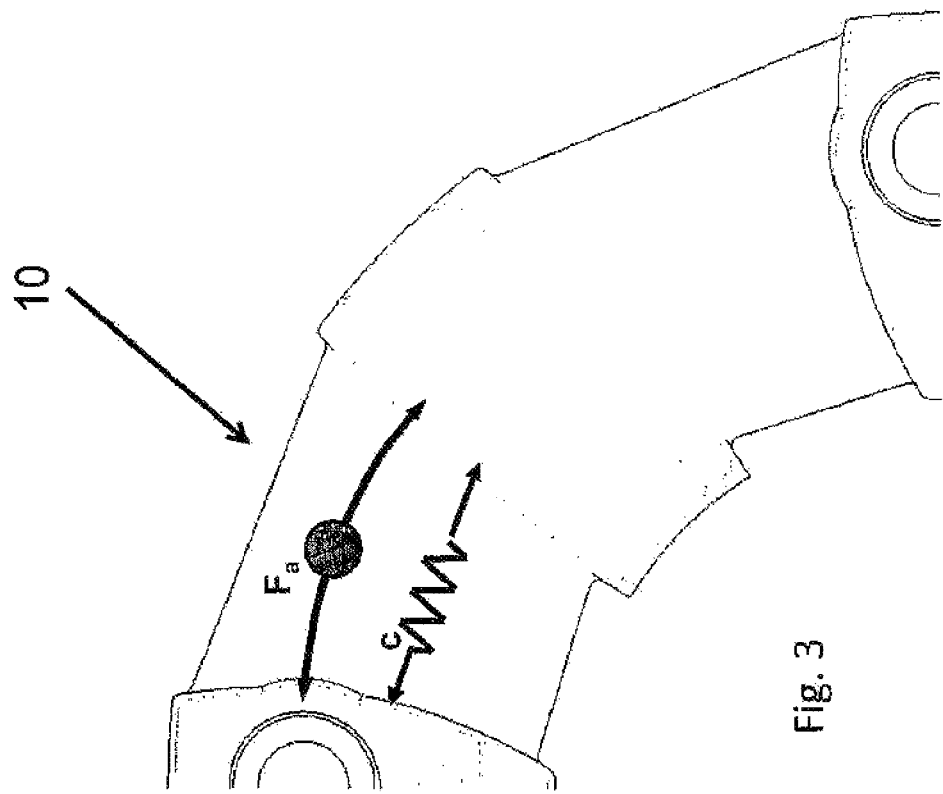
FIG. 3 is a partial schematic view of a coupling element according to the invention.

An actuator $F_a$ is embedded in the coupling body of FIG. 3. The actuator can be activated and controlled. By controlled activation of the actuator $F_a$, the resonance position can be changed. According to FIG. 4, this has an influence on the elasticity and/or damping d. Hence, the resonance position can be shifted depending on the current operating range. If a resonance position cannot be avoided, its vertical amplitude can be reduced by adjusting the damping.

Figure 4:
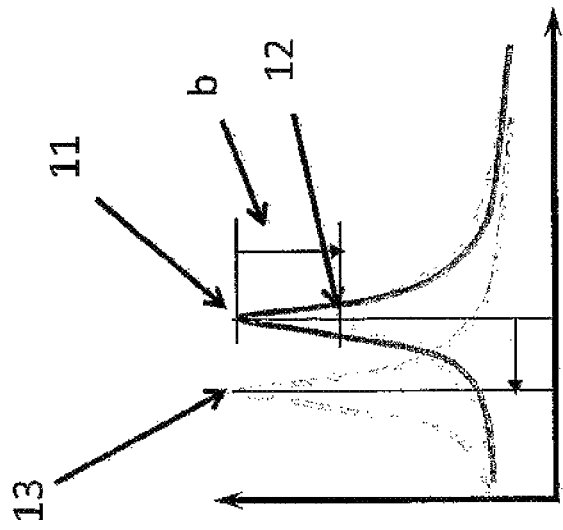
FIG. 4 is a graph showing the effect of the adjusting elements according to the invention on the resonance position of the coupling element of FIG. 3 plotted against frequency.

FIG. 4 illustrates that by activating the actuator $F_a$, the peak resonance 11 is reduced by the amount b to the reduced extent 12. This means that by activation, the actuator $F_a$ increases the damping d of the coupling body 10. Furthermore, FIG. 4 illustrates that instead of an increase of damping, the elasticity can be changed. Here, the actuator $F_a$ effects a shift of the frequency of the resonance peak 11 along the X-axis to a new position 13. FIG. 4 is a static illustration and in a dynamic drive system with an elastic shaft coupling usually mixed states occur in the frequency spectrum. Depending on the situation, the influence on the elasticity and/or damping can be adapted to the application.

To be able to change the damping or the elasticity of the coupling body 10, the coupling body 10 according to the invention is further configured as follows:

In a first illustrated embodiment of the invention, magnetic particles are embedded in the elastomer, in particular rubber. During vulcanization of the coupling body, a magnetic field is applied so that the particles are aligned and thus the elasticity can be specified as a base value 1 at least in one direction. After completion of vulcanization, the magnetic field is canceled. Thus, the alignment of the particles is canceled and the elasticity is changed to a higher value 2 by restraint of the sliding planes. Thereby, a magneto-rheological elastomer is obtained so that, when a magnetic field is reapplied, it can be changed in a proportional and reversible manner with respect to its stiffness.

During operation of a shaft coupling, to start with the actuators embedded in the elastomer have no effect. To specifically influence the elasticity and/or damping of the coupling body 10, it needs to be integrated in a control circuit. To this end there is a sensor 33 (FIG. 6) that detects torsional vibration of the system, an actuator that activates the magnetic particles, and a central controller that compares the actual value with a predetermined set point and, by the electromagnet, determines the strength of the magnetic field and thus the strength of the excitation or orientation of the magnetic particles.

By integrating magnetic particles into the coupling body and thus by forming a magneto-rheological elastomer and integrating it into a control circuit, an adaptive coupling is created that, by influencing the elasticity and the damping of the elastomer, can effectively damp torsional vibrations within an operating range that is wider than that of the prior art.

In an alternative embodiment actuators in the form of piezo elements are embedded in the elastomeric coupling body 10. Such piezo elements deform when an electrical voltage is applied or generate an electrical voltage when deformed. Examples are different crystals, quartzes or industrially producible sinter ceramics that have piezo properties.

Ideally, several piezo elements are set in a row above one another to form a stack. Such a stack creates a large adjustment stroke and very large adjustment forces. The piezo elements used in this embodiment as actuators are to be oriented within the elastomer with respect to their active direction. It is conceivable to operate such an assembly in tension or compression with respect to the deformation of the coupling body 10. Also conceivable is use of shear. The object is to align the piezo elements within the elastomer in such a manner that they can directly or indirectly counteract dynamic operating forces.

Also, an elastic shaft coupling with piezo elements embedded in the coupling body 10 is part of a control circuit. As already described above, torsional vibrations are detected by a suitable sensor; a controller compares this value with a set point and activates the piezo elements by applying a voltage sufficient to optimally damp the torsional vibration completely. In this embodiment, some of the piezo elements potentially combined in a stack can serve as the sensor. They are deformed by torsional vibration pulses and generate a voltage that is proportional to the strength of the vibrations. The piezo elements serving as actuators can be controlled by the control circuit for vibration damping.

A third embodiment uses an actively controllable damping mass to eliminate torsional vibration in the drive train.

It is principally known for rotating systems to provide a rotating body with a damping mass, also called counter-vibratory mass that, in a predetermined operating state or over a predetermined operating range, due to its natural vibration, eliminates the torsional vibration of the rotating body to a predetermined extent. Such damping masses that are rigidly connected to the rotating body can be found, for example, on engine flywheels.

In the third embodiment of the invention, a coupling body 10 as in the prior art is supplemented via a connecting element is with such a damping mass. The connecting element is now to be considered as a resilient coupling body in terms of its combining properties of elastic shaft coupling and damping mass. The connecting element can be configured as magneto-rheological elastomer and thus as described above can have actuators in the form of magnetic particles, or actuators in the form of piezo elements. The elasticity and/or the damping of the connecting element can be influenced in both cases, so that depending on the torsional vibration in the drive train, the counter vibration of the damping mass necessary for damping is controllable.

Figure 5:
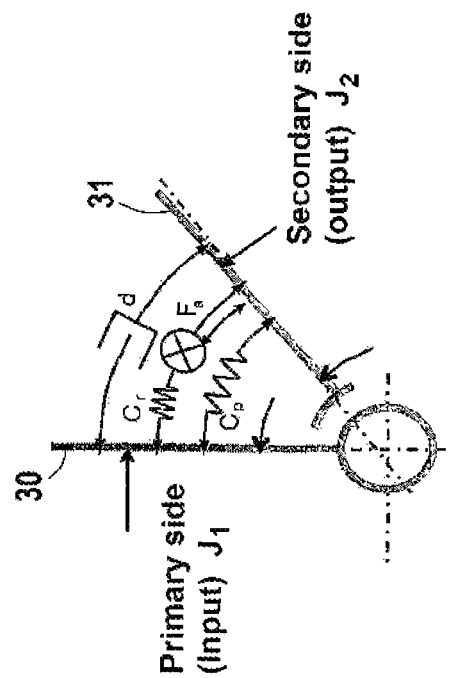
FIG. 5 is a schematic view of an arrangement for adjusting elements within the coupling body.

FIGS. 5 and 6 show schematically the possible arrangement of actuators $F_a$ relative to the basic elasticity c and to the basic damping d. FIG. 5 schematically shows how the actuators are embedded in the elastomer forming the coupling body. As already described above, this can involve piezo elements or magnetic particles.

$F_a$ and elasticity c can be in series as shown in FIG. 5 by elasticity $C_r$ and the downstream actuator $F_a$. However, it is also possible that $C_r$ is abandoned and the actuator $F_a$ acts parallel to the elasticity $C_p$. A combination is also possible.

FIG. 6 illustrates schematically the third embodiment in which a damping mass $m_T$ is coupled via a connecting element shown schematically at 32 to the coupling body 10. The connecting element 32 again is an elastomer in which actuators $F_T$ are embedded. They influence the damping d and/or the elasticity c of the resilient connecting element 32 in order to influence the vibration frequency of the damping mass in such a manner that it eliminates or reduces torsional vibration in the drive train.

In summary, the invention relates to a more advanced elastic coupling that is designed for damping torsional vibration in a predetermined operating state of the drive train. By adding actuators that are embedded into the elastomer or are combined therewith, the elastic shaft coupling is further developed to form an adaptive coupling that, by integrating the actuators in a control circuit, can damp torsional vibrations in different operating states of the coupling. In theory, with an appropriate control program, for each vibration frequency, a vibration-erasing elasticity or damping can be implemented.

This way, vibrations in the drive train can be reliably suppressed over a wide speed range, producing a positive effect on the service life of, for example, a transmission connected to a diesel engine via the elastic shaft coupling.

The invention claimed is:

1. An elastic shaft coupling comprising:
   a resilient coupling body;
   a drive-side connector and an output-side connector connected to opposite sides of the coupling body;
   an actively controllable damping mass;
   a connecting element connecting the damping mass to the coupling body; and
   adjusting elements acting on the connecting element for influencing how the shaft coupling compensates for torsional vibrations.

2. The elastic shaft coupling according to claim 1, further comprising:
   an actuator that influences the adjusting elements.

3. The elastic shaft coupling according to claim 2, wherein the actuator influences the adjusting elements in a contactless manner.

4. The elastic shaft coupling according to claim 2, wherein the actuator is a device for generating a magnetic field.

5. The elastic shaft coupling according to claim 4, wherein the actuator is an electromagnet.

6. The elastic shaft coupling according to claim 5, wherein the field strength of the electromagnet is controllable.

7. The elastic shaft coupling according to claim 2, wherein the actuator acts directly on the coupling body.

8. The elastic shaft coupling according to claim 1, wherein the coupling body is an elastomer.

9. An elastic shaft coupling comprising:
a resilient coupling body;
a drive-side connector and an output-side connector connected to opposite sides of the coupling body;
an actively controllable damping mass;
a connecting element connecting the damping mass to the coupling body;
to adjusting elements acting on the connecting element for influencing how the shaft coupling compensates for torsional vibrations;
an actuator that influences the adjusting elements; and
a sensor element that detects an operating state of the shaft coupling.

10. The elastic shaft coupling according to claim 9, wherein the adjusting elements, the actuator, and the sensor are part of a control circuit that influences the elasticity of the resilient coupling body by comparing a set point and an actual value of the torsional vibration of the shaft coupling.

11. An elastic shaft coupling comprising:
a resilient coupling body;
a drive-side connector and an output-side connector connected to opposite sides of the coupling body;
an actively controllable mass damping torsional vibration;
a resilient coupling body of variable stiffness connected between the coupling body and the mass; and
adjusting elements acting on the resilient coupling body for influencing how the shaft coupling compensates for torsional vibrations.

* * * * *